(12) United States Patent
Linhart

(10) Patent No.: US 6,845,373 B2
(45) Date of Patent: Jan. 18, 2005

(54) TEXT STREAM FILTER

(75) Inventor: Christian Linhart, Salzburg (AT)

(73) Assignee: Wind River Systems, Inc., Alameda, CA (US)

( * ) Notice: Subject to any disclaimer, the term of this patent is extended or adjusted under 35 U.S.C. 154(b) by 356 days.

(21) Appl. No.: 09/929,442

(22) Filed: Aug. 14, 2001

(65) Prior Publication Data

US 2003/0037027 A1 Feb. 20, 2003

(51) Int. Cl.$^7$ .............................................. G06F 17/30
(52) U.S. Cl. ........................ 707/3; 707/4; 707/100
(58) Field of Search ........................... 707/1–4, 5, 100; 358/474; 704/1–9

(56) References Cited

U.S. PATENT DOCUMENTS

| | | | | |
|---|---|---|---|---|
| 5,590,317 A | * | 12/1996 | Iguchi et al. .................. 707/2 |
| 5,717,913 A | * | 2/1998 | Driscoll .......................... 707/5 |
| 5,778,361 A | * | 7/1998 | Nanjo et al. .................... 707/5 |
| 5,890,103 A | * | 3/1999 | Carus ............................. 704/9 |
| 6,041,141 A | * | 3/2000 | Yamamoto et al. .......... 382/231 |
| 6,122,657 A | * | 9/2000 | Hoffman et al. ............. 709/201 |
| 6,199,062 B1 | * | 3/2001 | Byrne et al. ................... 707/3 |
| 6,327,561 B1 | * | 12/2001 | Smith et al. ................... 704/9 |
| 6,360,023 B1 | * | 3/2002 | Betrisey et al. ............. 382/260 |
| 6,615,266 B1 | * | 9/2003 | Hoffman et al. ............. 709/227 |

* cited by examiner

*Primary Examiner*—Greta Robinson
*Assistant Examiner*—Cheryl Lewis
(74) *Attorney, Agent, or Firm*—Davidson, Davidson & Kappel, LLP

(57) ABSTRACT

A method and apparatus for filtering an input text stream includes receiving a definition of a filter configuration and modifying the input text stream according to the filter configuration so as to generate a filtered text stream. The filtered text stream includes positioning information for the input text stream. The positioning information may be useable by a downstream scanning device of a parser.

53 Claims, 5 Drawing Sheets

TEXT STREAM FILTER

BACKGROUND INFORMATION

In the computer science field, text stream filters find application in a variety of applications, such as parser filters, pattern matchers, etc. Such filters may be used to modify a text stream being inputted to a device so as to achieve desired properties of the text stream. For example, a text stream filter may be used to filter input to a parser, thus serving as a parser filter.

A parser is a program for extracting syntactic, symbolic and/or semantic information from source code. A typical parser includes a front end, usually a scanner, for tokenizing an input source code stream. The scanner compares the input source code stream to a set of predefined patterns. When a pattern is matched, an action which has been defined for the pattern is executed. For example, the matched source code may be sent as a token to a syntax analysis subsystem. Scanners may be stand-alone programs or included in other applications, such as compiler front ends, text editors for syntax highlighting, and text filters.

A parser filter may be used upstream of a parser to modify the input to the parser so that the parser can still process source code containing nonstandard code. Such modification may be useful, for example, for parsing a dialect of a language. For example, a parser filter might implement "ignore" rules to replace with blanks certain nonstandard text strings which might not be understandable by the parser.

Prior text filters have a number of limitations. First, they are capable of replacing input text only by blanks, or whitespace, ("ignoring") but not by other text ("replacing"). Prior text filters do not provide positioning information indicating, for example, the length of an original text block before a replacing action. As a consequence, ignore rules must often be defined to ignore certain source code constructs completely. Significant amounts of source code may not be read by the parser, leading to missing symbols. Without positioning information, input text may only be replaced with replacement strings having the same length as the text to be replaced. When only ignore rules are used, matched text may be replaced with an equal number of whitespace characters. To perform replacements of arbitrary length, positioning information is necessary.

Secondly, prior text filters do not support context-dependent patterns, i.e., they provide no mechanism for controlling in which situations an ignore or replace rule is active. Additionally, prior text filters do not support full regular expressions as patterns. Furthermore, prior text filters used as parser filters are interwoven tightly in a specific parser's code, so for every parser a tailored parser filter is required.

Thus, prior text filters are relatively inflexible.

SUMMARY

In accordance with a first embodiment of the present invention, a method for filtering an input to a parser is provided. The method includes receiving a definition of a filter configuration and modifying the input text stream according to the filter configuration so as to generate a filtered text stream including positioning information for the input text stream.

In accordance with a second embodiment of the present invention, an apparatus for filtering a text stream is provided. The apparatus includes a filter configuration data structure and a scanner unit configured to modify the input text stream using the filter configuration data structure so as to generate a filtered text stream, the filtered text stream including positioning information for the input text stream.

In accordance with a third embodiment of the present invention, a computer readable medium having stored thereon computer executable process steps operative to perform a method for filtering an input text stream is provided. The method includes: receiving a definition of a filter configuration; and modifying the input text stream according to the filter configuration so as to generate a filtered text stream, the filtered text stream including positioning information for the input text stream.

In accordance with a fourth embodiment of the present invention, a parsing device is provided. The parsing device includes: a filter configuration data structure; a first scanner unit configured to modify the input text stream using the filter configuration data structure so as to generate a filtered text stream, the filtered text stream including positioning information for the input text stream; and a second scanning unit configured to process the filtered text stream so as to apply the positioning information.

BRIEF DESCRIPTION OF THE DRAWINGS

FIG. 5 shows a flow chart of a method for generating a scanner using start states associated with patterns to be scanned for.

DETAILED DESCRIPTION

Figure 1:
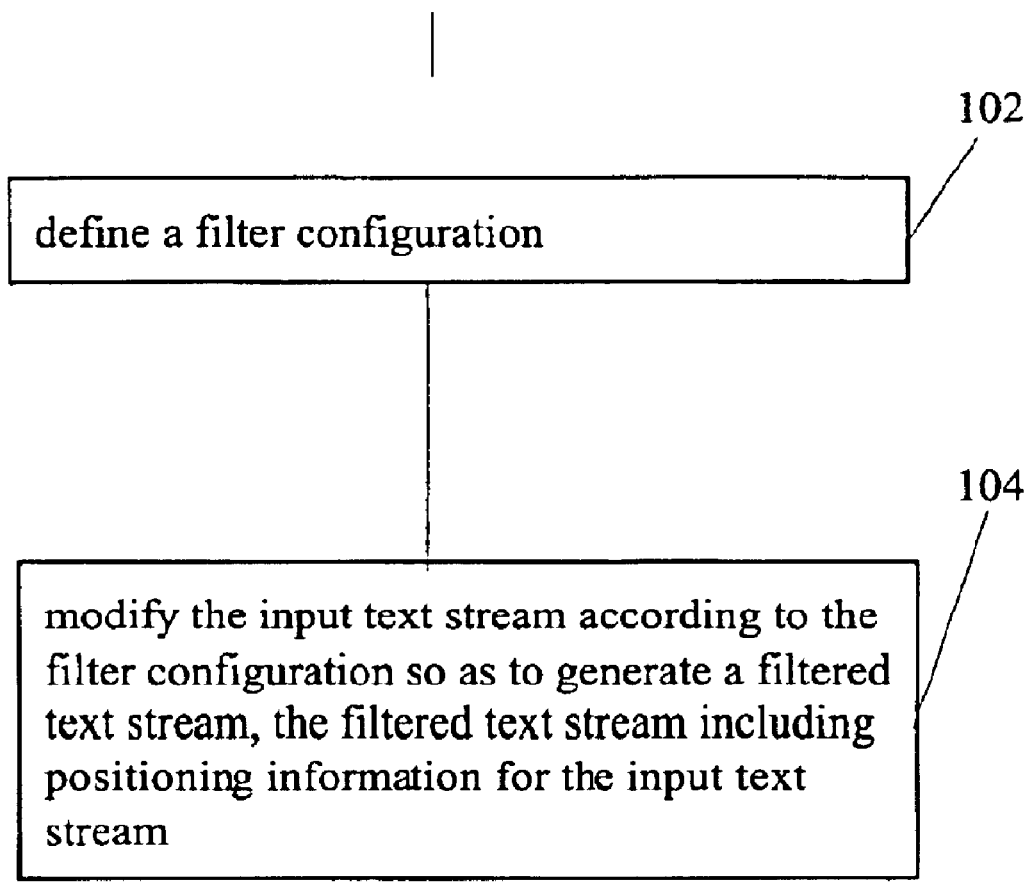
FIG. 1 shows a flow chart of a method for filtering an input text stream.

As described above, the present invention provides a method for filtering an input text stream. The filtered text stream produced includes positioning information for the input text stream. This enables text replacements, in addition to text ignores, to be performed by the filter. The method in accordance with certain embodiments of the present invention includes receiving a definition of a filter configuration, and modifying the input text stream according to the filter configuration so as to generate a filtered text stream including positioning information for the input text stream.

Receiving a definition of the filter configuration may include receiving a definition of a plurality of patterns and receiving a definition of a respective association between each of the plurality of patterns and a respective executable action. Moreover, receiving a definition of the filter configuration may include processing each of the plurality of patterns and the respective association so as to form a scanner data structure capable of comparing the input text stream to at least one of the plurality of patterns, and causing execution of the associated executable action upon a match of the input text stream with the respective one of the plurality of patterns. The processing and the comparing may be performed in a same active process.

Receiving a definition of the filter configuration may further include associating at least one respective start state of a plurality of start states with each of the plurality of patterns, and setting a current start state, the current start state being one of the plurality of start states. The processing may include processing the at least one respective start state along with each associated pattern so as to form a part of the scanner data structure. The comparing may be performed so as to compare only the patterns of the plurality of patterns associated with a respective start state equal to the current start state. Moreover, each respective start state is included in a context.

The definition of the filter configuration may be received from a data structure.

At least one of the respective executable actions may include replacing a matched text in the input text stream with a respective replacement text. Moreover, modifying the input text stream may include replacing at least one character in the input text stream with a replacement text. The replacement text may be determined dynamically, may be computed by the respective executable action, and/or determined using at least a portion of the matched text.

The method according to the present invention may further include comparing the input text stream to a plurality of patterns and causing replacing of matched text in the input text stream with a respective replacement text upon a match of the input text stream with the respective one of the plurality of patterns, the replacing being included in at least one of the respective executable actions.

Modifying the input text stream may include determining a difference in a number of characters between the at least one character and the replacement text. The positioning information may include the difference.

The positioning information may refer to positions of characters in the input text stream. Moreover, the positioning information may include directives. The directives may include executable actions, the executable actions being executable by a scanner receiving the filtered text stream.

Certain embodiments of the method according to the present invention may further include providing a modified scanner generator skeleton configured to receive the filtered text stream, the modified scanner generator skeleton being useable to generate a scanner capable of applying the positioning information. Moreover, the method according to the invention may include generating the scanner using the modified scanner generator skeleton. The scanner may form part of a parser. The part may include a front end of the parser.

Receiving a definition of the filter configuration may further include associating at least one respective start state of a plurality of start states with each of the plurality of patterns, and setting a current start state, the current start state being one of the plurality of start states. The processing may include processing the at least one respective start state along with each associated pattern so as to form a part of the scanner data structure. The comparing may be performed so as to compare only the patterns of the plurality of patterns associated with a respective start state equal to the current start state. Moreover, each respective start state is included in a context.

The present invention also provides an apparatus for filtering a text stream. The apparatus includes a filter configuration data structure and a scanner unit configured to modify the input text stream using to the filter configuration data structure so as to generate a filtered text stream. The filtered text stream includes positioning information for the input text stream.

The present invention also provides a computer readable medium having stored thereon computer executable process steps operative to perform a method for filtering an input text stream. The method includes receiving a definition of a filter configuration, and modifying the input text stream according to the filter configuration so as to generate a filtered text stream. The filtered text stream includes positioning information for the input text stream.

The present invention also provides a parsing device including a filter configuration data structure and a first scanner unit configured to modify the input text stream using the filter configuration data structure so as to generate a filtered text stream. The filtered text stream includes positioning information for the input text stream. The parsing device also includes a second scanning unit configured to process the filtered text stream so as to apply the positioning information. In certain embodiments, the second scanning unit may include a modified scanner generator skeleton configured to receive the filtered text stream. The modified scanner generator skeleton may be useable to generate a scanner capable of applying the positioning information.

FIG. 1 shows a flow chart of a method according to the present invention for filtering an input text stream. First, a filter configuration is defined (Step 102). Then, the input text stream is modified according to the filter configuration so as to generate a filtered text stream, the filtered text stream including positioning information for the input text stream (Step 104).

Figure 2:
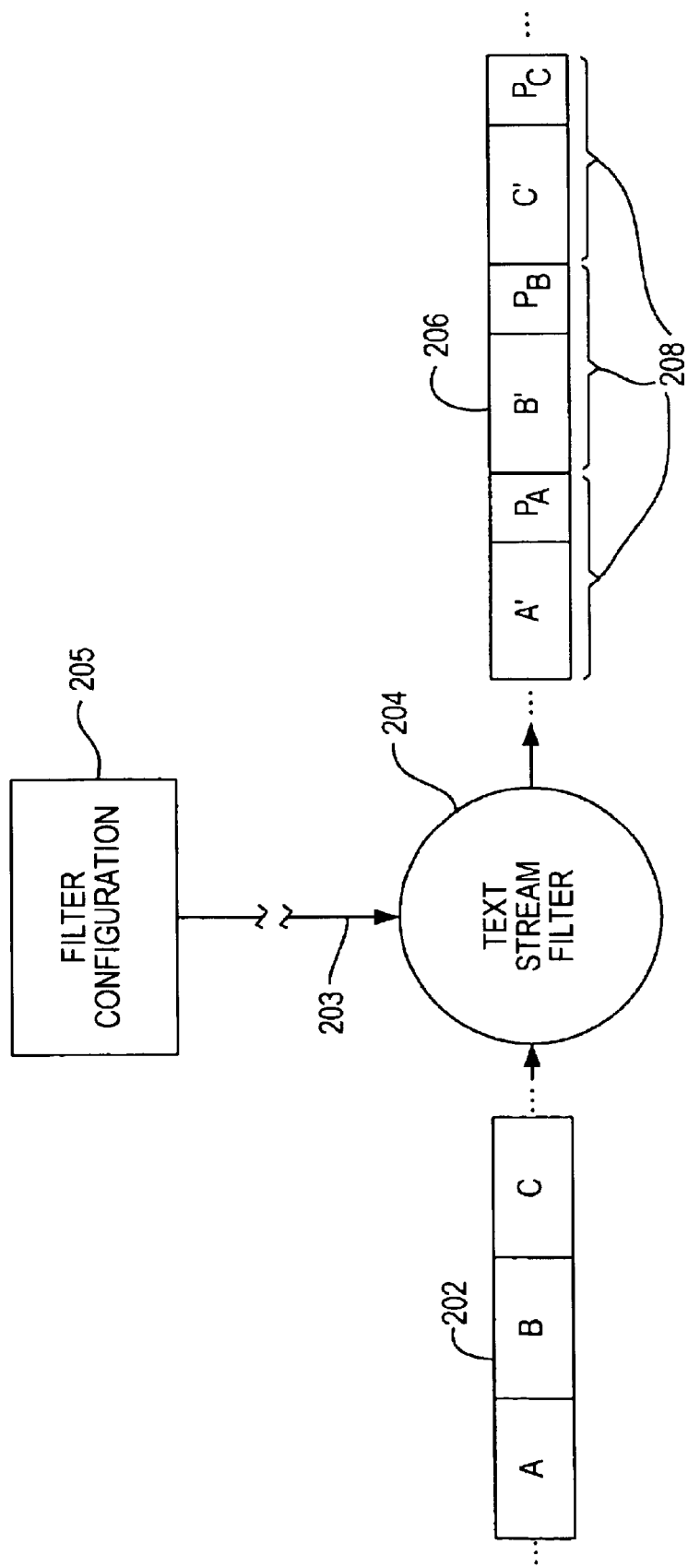
FIG. 2 shows a schematic diagram demonstrating filtering of a text stream.

FIG. 2 shows a schematic diagram demonstrating filtering of a text stream according to the present invention. Input text stream 202 includes a serial stream of input text strings A, B, C. Only three text strings are depicted, though more or fewer text strings could be present in text stream 202. Input text strings A, B, C may each include one or more text characters. Input text stream 202 is input into text stream filter 204. Text stream filter 204 processes input text stream 202 based on filter configuration 205, and outputs filtered text stream 206. The break in arrow 203 between filter configuration 205 and text stream filter 204 in FIG. 2 indicates that additional processing may be performed on filter configuration 205 before it is inputted into text stream filter 204. Text stream filter 204 searches for predefined text patterns in input text stream 202 and, upon a match, performs a respective predefined action on the matched text. Text stream filter 204 also produces position information for text strings A, B, C and interleaves the position information into filtered text stream 206.

Filter configuration 205 includes one or more rules for filtering input text stream 202. The rules may include text patterns, i.e., regular expressions, text, or other arrangements of characters, symbols, etc., to be searched for in input text stream 202, and start states used for controlling when a given pattern is active, i.e., when input text stream 202 is to be searched for the given pattern—and when not. Alternatively, "contexts" may be used to control when a given pattern is active. Contexts are described in the patent application entitled "Dynamic Scanner," applicant docket number 218.1022, assigned to applicant and filed on even date herewith, and which is herewith incorporated by reference herein. Additionally, the rules for filtering input text stream 202 may include actions to be performed upon a match with one of the patterns. The actions may include replacing the matched text in the input stream with another text, replacing the matched text with blank characters, or simply copying the matched text to filtered text stream 206.

Filtered text stream 206 includes a serial stream of text-directive pairs 208. Only three text-directive pairs are depicted, though more or fewer number pairs—corresponding to the number of input text strings A, B, C in input text stream 202—could be present in text stream 202.

Text-directive pairs 208 each include a respective output text string A', B', C' and a respective associated directive $P_A$, $P_B$, $P_C$.

Each output text string A', B', C' may include either: a copy of the corresponding input text string A, B, C; text inserted by text stream filter 204 as a replacement for the corresponding text string A, B, C; an empty string inserted by text stream filter 204 as a replacement for the corresponding input text string A, B, C (pursuant to an ignore rule).

Directive $P_A$, $P_B$, $P_C$ provide positioning information. Each directive $P_A$, $P_B$, $P_C$ includes a number representing the difference between the number of characters in each output text string A', B', C' and in the respective input text string A, B, C. In other embodiments of the present invention, other types of positioning information may be used.

Text stream filter 204 may include a scanner generated using a scanner generator, such as Flex, for example. Flex is a scanner generator developed as open-source software by the University of California at Berkeley. Alternatively, a scanner generated by any suitable scanner generator may be used. The scanner may perform the pattern-matching and associated replacement, etc., actions on input text stream 202. The scanner may be a scanner generated by inputting patterns, start states and actions into an appropriate scanner generator as a scanner definition file, i.e., a filter configuration file. The scanner generator is run, and a scanner in the form of source code including serialized data structures the actions from the scanner definition file verbatim. After compiling, the scanner in the form of a scanner data structure in machine language is ready to be run for text filtering operations as a stand-alone scanner or linked to object code of another program. Such a scanner may be referred to as a static scanner.

In other embodiments of the present invention, text stream filter 204 may include a dynamic scanner as described in the "Dynamic Scanner" application of applicant, referenced above. Using the dynamic scanner for text stream filter 204 enables the text stream filter itself to be generated without intermediate compiling being performed between forming the filter configuration file and outputting of the finished text stream filter. The dynamic scanner may include a data structure which includes, among other things, pointers to action objects for performing the replacement, etc., actions on input text stream 202.

Filtered text stream 206 may be fed into a suitable client or other device (not shown) which is capable of interpreting text-directive pairs 208. Such a client may include a parser front end, as described with reference to FIG. 3.

Figure 3:
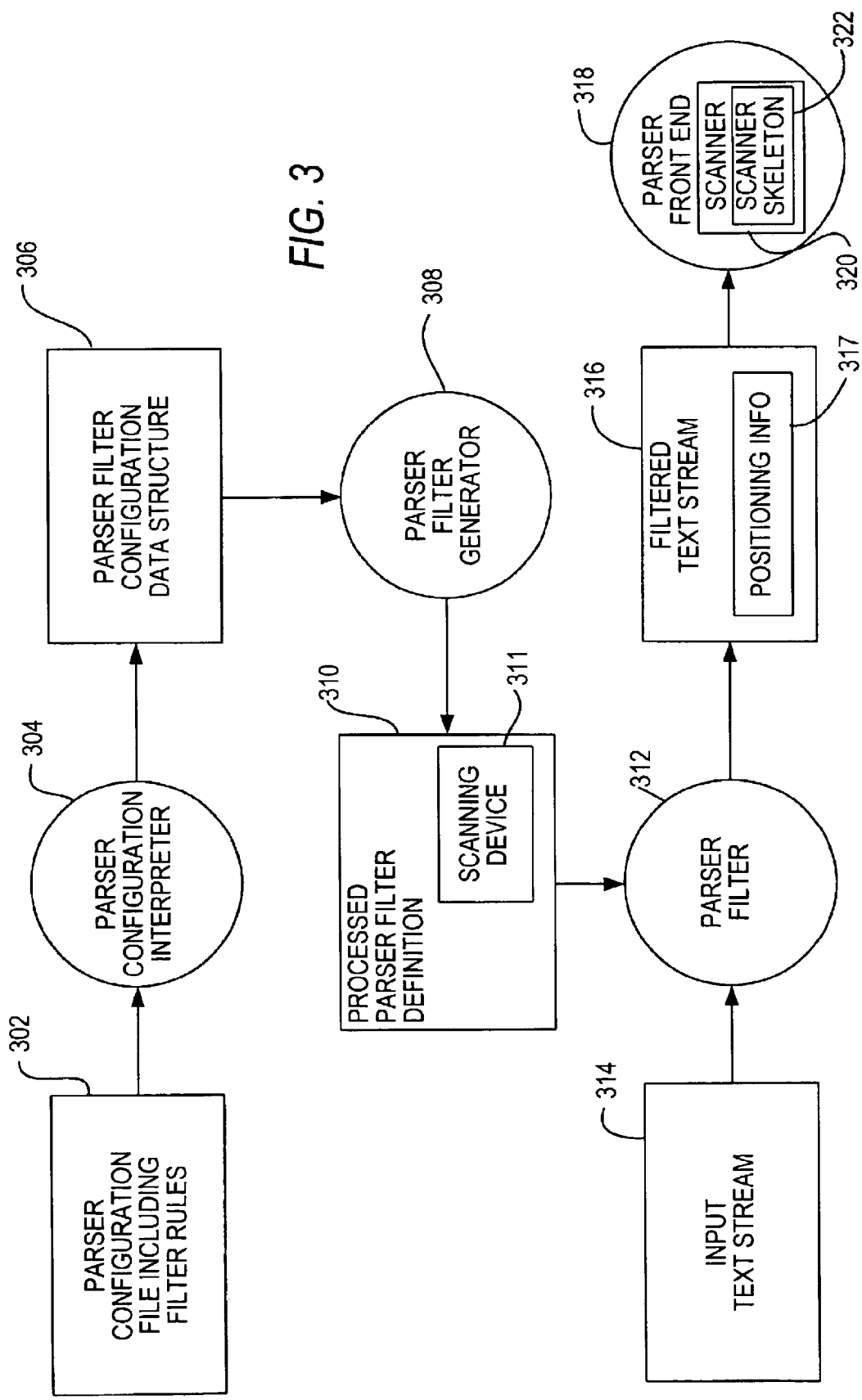
FIG. 3 shows a schematic block diagram for filtering an input text stream to a parser.

FIG. 3 shows a schematic block diagram according to an embodiment of the present invention for filtering input text stream to a parser. Parser filter 312 filters input text stream 314 and outputs filtered text stream 316. Input text stream 314 may be, for example, a stream of source code to be parsed. Filtered text stream 316 includes positioning information 317 for input text stream 314. Preferably, filtered text stream 316 includes text-directive pairs, each text-directive pair including a text portion and a number representing positioning information for input text stream 314, as described above with reference to input text stream 202 in FIG. 2. Filtered text stream 316 is fed into parser front end 318.

To form parser filter 312, parser filter configuration file 302 is formed. Parser filter configuration file 302 includes patterns to be searched for input text stream 314, one or more start states associated with each pattern for controlling when the pattern is active (to be searched), and executable actions to be performed upon a matching of a pattern in input text stream 314. The actions may include replacement of at least one character of replacement text in input text stream 314 with other text, replacement of text in the input text stream 314 with an empty string, i.e., an "ignore action," or simply copying the matched text to filtered text stream 316.

The replacement text may be determined dynamically, for example, using the matched text in input text stream 314. Examples of determining the replacement text using the matched text include: the replacement text is matched text converted to upper-case characters; the replacement text is matched text converted to lower-case characters; the replacement text includes parts of the matched text which are matched by sub-expressions of a regular expression used to match the matched text; the replacement text is an altered sequence of the characters and/or sub-strings of the matched text; and combinations of the above.

Parser filter configuration file 302 is input to parser configuration interpreter 304, which converts the file to parser filter configuration data structure 306. Parser configuration interpreter 304 is a parser which parses the parser configuration file and generates a parser filter configuration data structure. Parser configuration interpreter 304 may include a dynamic scanner according to an embodiment of the invention described in the application of applicant entitled "Dynamic Scanner," referenced above. Moreover, parser configuration interpreter 304 may include a syntax analysis device generated by a LALR(1) parser generator, such as YACC, BISON, LARK, etc. Parser filter configuration data structure 306 forms an input to parser filter generator 308. Parser filter configuration data structure 306 preferably has a format appropriate for being processed by parser filter generator 308.

Parser filter generator 308 may be a dynamic scanner generator as described in the "Dynamic Scanner" application of applicant, referenced above. Alternatively, parser filter generator 308 may be a scanner generator, such as Flex, for example. Parser filter generator 308 outputs processed parser filter generator definition 310, which includes scanning device 311. Scanning device 311 may be a dynamic scanner data structure as described in the "Dynamic Scanner" application of applicant, referenced above. Such a dynamic scanner data structure may include pointers to action objects for performing the actions defined in parser filter configuration file 302. Alternatively, scanning device 311 may be a static scanner in the form of source code, produced by Flex, for example. Such a static scanner would require compiling before use in parser filter 312.

Parser filter 312 processes input text stream 314 using processed parser filter definition 310. Searching for text matching the patterns defined in parser filter configuration file 302 and performing the corresponding actions when a match is found is performed by scanning device 311. Positioning information is determined by the executable actions which perform the text replacements upon a matching of a pattern in input text stream 314. An executable action may generate one or more directives. A directive may include the difference in length between the matched text and the replacement text, as described above. An executable action has access to both the matched text and the replacement text for determining this difference in length.

Cascading of multiple parser filters may be achieved by using an embodiment of the dynamic scanner described in the "Dynamic Scanner" application of applicant, referenced above. Scanning device 311 of processed parser filter definition 310 may be a dynamic scanner. The dynamic scanner skeleton may be modified so that the dynamic scanner can read a text stream with positioning information. The input and output of parser filter 312 then have the same format, enabling the parser filter to be cascaded with other similar parser filters.

Filtered text stream 316 is fed into parser front end 318. Parser front end 318 processes filtered text stream 316 so as to extract and interpret the positioning information included therein. Parser front end 318 may include scanner 320 for extracting and interpreting the positioning information. Scanner 320 may include scanner skeleton 322, which may be a modified scanner skeleton of a scanner generator such as Flex or Rex, for example. The scanner skeleton is here intended to include source code which is nearly invariant over all scanners generated by the respective scanner generator, i.e., the source code which is independent of the scanner configuration—patterns, start states and actions. In addition, the scanner skeleton includes indicators on where to insert source code which depends on the scanner definition. The scanner skeleton may also include source code present in the generated scanner when certain types of patterns or actions are used.

Parser front end 318 may be implemented on top of the Parser Framework of the SNiFF+™ integrated development environment of applicant Wind River Systems, Inc. Scanner skeleton 322 is then present as a part of the Parser Framework.

Scanner 320 may be generated using scanner skeleton 322. Scanner 320 may be a static scanner or it may be an implementation of the dynamic scanner as described in the "Dynamic Scanner" application of applicant, referenced above. Employing the dynamic scanner in parser front end 318 permits positioning information 317 to be applied automatically in parser front end 318 without modification of the parser front end by an author of rules for parser front end 318. Using the dynamic scanner enables a run-time configurable parser, useful, for example, for parsing of multiple, diverse dialects.

Positioning information 317 may include directives. The directives may be implemented as executable actions, or action-objects, which are executable by scanner 320 to modify parser front end 318. The action objects may include a set of action-functions tailored to the particular type of scanner 320. Scanner 320 may include variables which indicate the position of the currently scanned part of input text stream 314. The directives change the values of these variables such that the variables indicate the corresponding position in the original input text stream.

Figure 4:
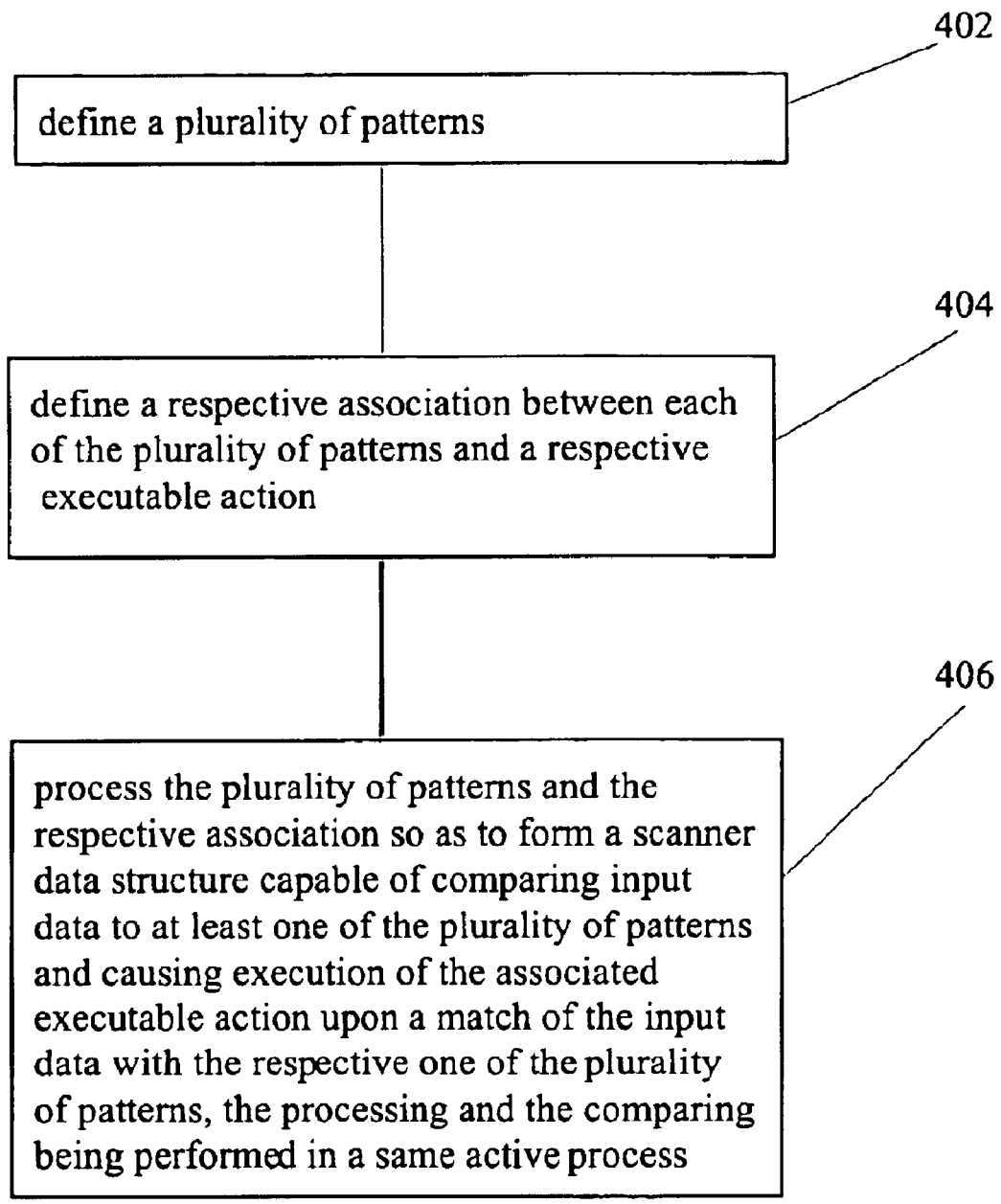
FIG. 4 shows a flow chart of a method for generating a scanner.

Reference may now be had additionally to FIG. 4. FIG. 4 shows a flow chart of a method for generating a scanner in accordance with an embodiment of the invention described in the application of applicant entitled "Dynamic Scanner," referenced above. The scanner generated may, for example, be used in parser filter 312 for filtering input text stream 314, or may serve as scanner 320 in parser front end 318. First a plurality of patterns is defined (Step 402). The patterns may include regular expressions, text patterns, or other arrangements of characters, symbols, etc., for which it is desired to search input data, such input text stream 314. The patterns may be defined by entering each pattern into a file, table or array in a memory structure, for example, such as parser configuration file 302. The input data may be a data stream, data file, or any suitable data which can be read in.

Next, a respective association between each of the plurality of patterns and a respective executable action is defined (Step 404). Each association may take the form of a pointer, an action-pointer, an index, or any suitable means of associating a pattern with a respective executable action. The receiving a definition of the associations may be performed in the same active process as the processing of the patterns and associations, as described below. Each executable action may include a respective action object, program code and/or data. In some embodiments of the present invention, an action object may be generated in the same active process as the active process in which the patterns and associations are processed, as described below.

Each of the plurality of patterns and the respective association are then processed so as to form a scanner data structure capable of comparing input data to each of the plurality of patterns and causing execution of the associated executable action upon a match of the input data with the respective one of the plurality of patterns, with the processing and the comparing being performed in the same active process (Step 406). As noted above, the receiving a definition of and processing of the patterns and associated executable actions may occur in the same active process. Additionally, when the executable action includes an action object, the action object may be generated in the same active process. The same "active process" is here understood to mean a same running process with no intervening compiling, exiting to other programs, etc.

The patterns and respective associations with executable actions are preferably arranged, or loaded, into a scanner definition data structure. The scanner definition data structure may contain information analogous to the information contained in the scanner definition file for a prior art scanner generator, i.e., start states, patterns with respective associated actions and respective sets of the start states. Preferably, however, according to the present invention the actions are represented in the scanner definition data structure by a pointer to an action-object residing elsewhere. In other embodiments of the present invention indices may be used to represent the actions in the data structure.

Figure 5:
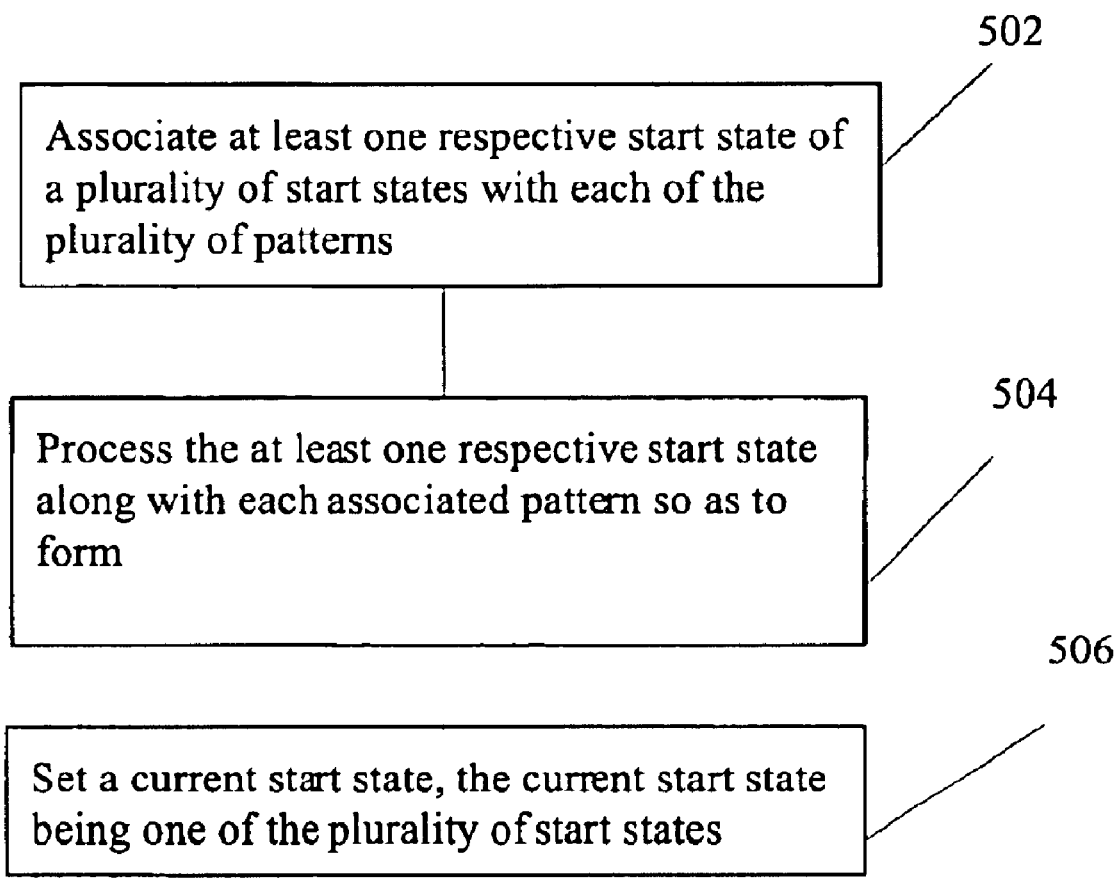

FIG. 5 shows a flow chart of a method for generating a scanner according to an embodiment of the invention described in the application of applicant entitled "Dynamic Scanner," referenced above, using start states associated with patterns to be scanned for. At least one respective start state of a plurality of start states is associated with each of the plurality of patterns (Step 502), the plurality of patterns being defined in Step 402 of the method depicted in the flowchart of FIG. 4 and discussed above. The plurality of start states may form part of the scanner definition data structure which includes the patterns and associated executable actions, as described above. A subset of the set of start states may be associated with each pattern in the scanner definition data structure.

At least one respective start state is processed along with each associated pattern so as to form a part of the scanner data structure (Step 504). The processing of Step 504 is performed as part of the processing Step 406 of the method depicted in the flowchart of FIG. 4 and discussed above. A current start state is set, the current start state being one of the plurality of start states (Step 506). The comparing portion of Step 406 is performed so as to compare only the patterns associated with a respective start state equal to the current start state. The start states may thus be used as a way to control when particular patterns are "active," i.e., a being scanned, or searched, for in the scanning process.

According to an embodiment of the present invention, the current start state may be set using a stack of the start states, the current start state being defined as the start state at the top of the stack of start states. The stack of start states supports the usual operations of a stack (push, pop, get top, set top, is empty). In addition, the complete stack may be copied to or from another variable. For example, the stack could be modified as a part of an execution of one of the executable actions. An initial value for the current start state may be set at the start of a scanning operation. By appropriate control of the stack, the current start state may be changed as the scanning process progresses.

In some embodiments of the present invention, instead of "pure" start states, contexts may be used to control when a given pattern is active for searching by the scanner. Contexts are described in the application of applicant entitled "Dynamic Scanner," referenced above. A context includes rules defining where the context starts and ends. Starting a context means pushing the corresponding start state onto a start state stack. Ending the context means popping the start state from the stack. Among other advantages, using contexts prevents a user trying to pop a start state from an empty stack.

The text stream filter according to the present invention may find application in any suitable application in which a text stream filter may be employed, including in a parser filter, a parser, and a compiler, for example.

The present invention has been described herein with reference to specific exemplary embodiments thereof. It will, however, be evident that various modifications and changes may be made thereto without departing from the broader spirit and scope of the invention as set forth in the claims that follow. The specification and drawings are accordingly to be regarded in an illustrative manner rather than a restrictive sense.

What is claimed is:

1. A method for filtering an input text stream, the method comprising:
   receiving a definition of a filter configuration; and
   modifying the input text stream according to the filter configuration so as to generate a filtered text stream, the filtered text stream including positioning information for the input text stream.

2. The method as recited in claim 1 wherein the receiving a definition of the filter configuration includes:
   receiving a definition of a plurality of patterns; and
   receiving a definition of a respective association between each of the plurality of patterns and a respective executable action.

3. The method as recited in claim 2 wherein the receiving the definition of the filter configuration further includes processing each of the plurality of patterns and the respective association so as to form a scanner data structure capable of comparing the input text stream to at least one of the plurality of patterns and causing execution of the associated executable action upon a match of the input text stream with the respective one of the plurality of patterns.

4. The method as recited in claim 3 wherein the processing and the comparing are performed in a same active process.

5. The method as recited in claim 3 wherein the receiving a definition of the filter configuration further includes:
   associating at least one respective start state of a plurality of start states with each of the plurality of patterns; and
   setting a current start state, the current start state being one of the plurality of start states; and
   wherein the processing includes processing the at least one respective start state along with each associated pattern so as to form a part of the scanner data structure, the comparing being performed so as to compare only the patterns of the plurality of patterns associated with a respective start state equal to the current start state.

6. The method as recited in claim 5 wherein each respective start state is included in a context.

7. The method as recited in claim 2 wherein at least one of the respective executable action includes replacing a matched text in the input text stream with a respective replacement text.

8. The method as recited in claim 7 wherein the replacement text is determined dynamically.

9. The method as recited in claim 8 wherein the replacement text is computed by the respective executable action.

10. The method as recited in claim 7 wherein the replacement text is determined using at least a portion of the matched text.

11. The method as recited in claim 10 wherein the replacement text is determined dynamically.

12. The method as recited in claim 10 further comprising comparing the input text stream to a plurality of patterns and causing the replacing upon a match of the input text stream with the respective one of the plurality of patterns.

13. The method as recited in claim 10 wherein the modifying the input text stream includes determining a difference in a number of characters between the at least one character and the replacement text.

14. The method as recited in claim 13 wherein the positioning information includes the difference in the number of characters between the at least one character and the replacement text.

15. The method as recited in claim 1 wherein modifying the input text stream includes replacing at least one character in the input text stream with a replacement text.

16. The method as recited in claim 15 wherein the replacement text is determined using at least a portion of the matched text.

17. The method as recited in claim 1 wherein the positioning information refers to positions of characters in the input text stream.

18. The method as recited in claim 1 wherein the positioning information includes directives.

19. The method as recited in claim 18 wherein the directives include executable actions, the executable actions being executable by a scanner receiving the filtered text stream.

20. The method as recited in claim 1 further comprising providing a modified scanner generator skeleton configured to receive the filtered text stream, the modified scanner generator skeleton being useable to generate a scanner capable of applying the positioning information.

21. The method as recited in claim 20 further comprising generating the scanner using the modified scanner generator skeleton.

22. The method as recited in claim 21 wherein the scanner forms part of a parser.

23. The method as recited in claim 22 wherein the part includes a front end of the parser.

24. An apparatus for filtering a text stream, the apparatus comprising:
   a filter configuration data structure; and
   a scanner unit configured to modify the input text stream using the filter configuration data structure so as to generate a filtered text stream, the filtered text stream including positioning information for the input text stream.

25. The apparatus as recited in claim 24 wherein the filter configuration data structure includes:

a plurality of patterns; and a respective association between each of the plurality of patterns and a respective executable action.

26. The apparatus as recited in claim 25 wherein the filter configuration is formed by processing each of the plurality of patterns and the respective association so as to form a scanner data structure capable of comparing the input text stream to at least one of the plurality of patterns and causing execution of the associated executable action upon a match of the input text stream with the respective one of the plurality of patterns.

27. The apparatus as recited in claim 26 wherein the processing and the comparing are performed in a same active process.

28. The apparatus as recited in claim 26 wherein the filter configuration further includes:

at least one respective start state of a plurality of start states associated with each of the plurality of patterns; and setting a current start state, the current start state being one of the plurality of start states; and wherein the processing includes processing the at least one respective start state along with each associated pattern so as to form a part of the scanner data structure, the comparing being performed so as to compare only the patterns of the plurality of patterns associated with a respective start state equal to the current start state.

29. The apparatus as recited in claim 25 wherein at least one of the respective executable action includes replacing a matched text in the input text stream with a respective replacement text.

30. The apparatus as recited in claim 29 wherein the replacement text is determined dynamically.

31. The apparatus as recited in claim 30 wherein the replacement text is computed by the respective executable action.

32. The apparatus as recited in claim 29 wherein the replacement text is determined using at least a portion of the matched text.

33. The apparatus as recited in claim 24 wherein modifying the input text stream includes replacing at least one character in the input text stream with a replacement text.

34. The apparatus as recited in claim 33 wherein the replacement text is determined dynamically.

35. The apparatus as recited in claim 33 wherein the replacement text is determined using at least a portion of the matched text.

36. The apparatus as recited in claim 33 wherein the scanner unit is further configured to compare the input text stream to a plurality of patterns and causing the replacing upon a match of the input text stream with the respective one of the plurality of patterns.

37. The apparatus as recited in claim 33 wherein modifying the input text stream further includes determining a difference in a number of characters between the at least one character and the replacement text.

38. The apparatus as recited in claim 37 wherein the positioning information includes the difference in the number of characters between the at least one character and the replacement text.

39. The apparatus as recited in claim 24 wherein the positioning information refers to positions of characters in the input text stream.

40. The apparatus as recited in claim 24 wherein the positioning information includes directives.

41. The apparatus as recited in claim 40 wherein the directives include executable actions, the executable actions being executable by a scanner receiving the filtered text stream.

42. The apparatus as recited in claim 24 further comprising a modified scanner generator skeleton configured to receive the filtered text stream, the modified scanner generator skeleton being useable to generate a scanner capable of applying the positioning information.

43. The apparatus as recited in claim 42 further comprising a scanner, the scanner being generated using the modified scanner generator skeleton.

44. The apparatus as recited in claim 43 wherein the scanner forms a part of a parser.

45. The apparatus as recited in claim 44 wherein the part includes a front end of the parser.

46. The apparatus as recited in claim 24 wherein each respective start state is included in a context.

47. A computer readable medium having stored thereon computer executable process steps operative to perform a method for filtering an input text stream, the method comprising:

receiving a definition of a filter configuration; and modifying the input text stream according to the filter configuration so as to generate a filtered text stream, the filtered text stream including positioning information for the input text stream.

48. The computer readable medium as recited in claim 47 wherein the definition of the filter configuration is received from a data structure.

49. A parsing device comprising:

a filter configuration data structure;

a first scanner unit configured to modify the input text stream using the filter configuration data structure so as to generate a filtered text stream, the filtered text stream including positioning information for the input text stream; and a second scanning unit configured to process the filtered text stream so as to apply the positioning information.

50. The parsing device as recited in claim 49 wherein the modifying the input text stream includes replacing at least one character in the input text stream with a replacement text and determining a difference in the number of characters between the at least one character and the replacement string, and wherein the positioning information includes the difference.

51. The parsing device as recited in claim 49 wherein the positioning information includes directives.

52. The parsing device as recited in claim 51 wherein the directives include executable actions, the executable actions being executable by the second scanning unit.

53. The parsing device as recited in claim 49 wherein the second scanning unit includes a modified scanner generator skeleton configured to receive the filtered text stream, the modified scanner generator skeleton being useable to generate a scanner capable of applying the positioning information.

* * * * *